United States Patent
Kobayashi et al.

[19]

[11] Patent Number: 5,969,919
[45] Date of Patent: Oct. 19, 1999

[54] DRIVE UNIT FOR ELECTRIC MOTOR

[75] Inventors: Akio Kobayashi; Osamu Tsurumiya; Takao Kurosawa; Nobuo Sugitani, all of Wako, Japan

[73] Assignee: Honda Giken Kogyo Kabushiki Kaisha, Tokyo, Japan

[21] Appl. No.: 09/153,170

[22] Filed: Sep. 15, 1998

[30] Foreign Application Priority Data

Sep. 16, 1997 [JP] Japan ................................ 9-251051

[51] Int. Cl.$^6$ .................................................. H02P 1/02
[52] U.S. Cl. .......................... 361/23; 318/254; 318/281; 318/293; 318/446
[58] Field of Search ........................ 361/23, 53, 31, 361/33, 30, 67; 323/364, 365, 349–352; 322/16.8, 38, 39, 28; 307/113, 116, 125; 318/280–290, 254, 293; 180/443–446

[56] References Cited

U.S. PATENT DOCUMENTS

| | | | |
|---|---|---|---|
| 3,984,741 | 10/1976 | Kind ........................................ | 318/293 |
| 4,146,826 | 3/1979 | Wojslawowicz ........................ | 318/297 |
| 4,972,133 | 11/1990 | Hirota et al. .......................... | 318/646 |
| 5,032,774 | 7/1991 | Juzswik ................................. | 318/293 |
| 5,369,349 | 11/1994 | Tsuchiya et al. ..................... | 318/811 |
| 5,903,121 | 5/1999 | Heine et al. .......................... | 318/434 |

*Primary Examiner*—Jeffrey Gaffin
*Assistant Examiner*—Kim Huynh
*Attorney, Agent, or Firm*—Merchant & Gould P.C.

[57] ABSTRACT

A drive unit for driving an electric motor includes two motor drive circuits disposed in parallel and each consisting of a bridge circuit of switching devices each incorporating a reverse blocking diode, a power switch provided between a power supply and each of the bridge circuits, and a function switch provided between the electric motor and each of the bridge circuits. In case of failure of one bridge circuit, the other bridge circuit is used to replace the failed bridge circuit, thereby continuing controlled operation of the electric motor. While these switches which are associated with one of the bridge circuits are closed, the switches associated with the other bridge circuit are kept open. This arrangement prevents the current from flowing from the power supply into the failed bridge circuit. The failed bridge circuit does not allow the electric motor to act as a generator even when any of the switching devices causes an ON fault.

6 Claims, 4 Drawing Sheets

DRIVE UNIT FOR ELECTRIC MOTOR

BACKGROUND OF THE INVENTION

1. Field of the Invention

The present invention relates generally to a drive unit for driving an electric motor by computer control based on information from various sensing devices, and more particularly to a motor drive unit for use with an electric power steering apparatus or a four-wheel steering system installed in a motor vehicle.

2. Description of the Related Art

An electric power steering apparatus installed in a motor vehicle includes a steering torque sensor for detecting a steering torque produced during steering operation by the driver. The steering torque sensor generates a torque signal corresponding to the detected steering torque, which is used in combination with a signal from another sensing device to generate a motor drive signal, such as PWM (pulse-width modulation) signal, for controllably driving an electric motor via a drive unit in such a way that an appropriate steering assist torque is supplied from the electric motor to the steering system, thereby lightening the manual steering effort of the driver.

One example of known motor drive unit includes a bridge circuit (H-type bridge circuit) composed of two pairs of switching elements or devices, such as junction field-effect transistors "JFETs" or metal-oxide-semiconductor field-effect transistors "MOSFET", each incorporating one diode connected in parallel with the associated switching device to block current flow in the opposite direction from that of the associated switching device (the diode being thereinafter referred to as "reverse blocking diode"). The switching devices in each pair are connected in series and two pairs of such series connected switching devices are connected in parallel. A power supply is connected to a junction between the two parallel connected switching device pairs, and the electric motor is connected between respective junctions between the series connected switching devices.

The motor drive unit of the electric power steering apparatus, as against a control unit for an automotive engine, does not employ a duplex system in which each of two distinct units becomes available to recover over a failure of the other unit. Accordingly, a failure occurring in the motor drive unit may result in malfunctioning of the entire system of the electric power steering apparatus. In the case where the failure is the so-called "Off fault" of any of the switching devices (at which the faulty switching device is fixed in the OFF state), no power is supplied from the power supply to the electric motor. In case of the failure being the so-called "ON fault" of any of the switching devices at which the faulty switching device is fixed in the ON state, power from the power supply is continuously supplied to the electric motor. In either case, accurate drive control of the electric motor is difficult to achieve.

The foregoing problems may be overcome by an improved motor drive unit in which a duplex system is incorporated. There still exist a problem however that when each of two distinct drive units is operating to controllably drive the electric motor while the other drive unit assumes a standby status, current may flow from the power supply to the other drive unit, deteriorating the accuracy of drive control of the electric motor. Additionally, when an ON fault occurs in one of the switching devices of the other drive unit, operation of one drive unit causes the other drive unit to form a closed circuit which allows the electric motor to act as a generator, making it difficult to achieve accurate drive control of the electric motor.

SUMMARY OF THE INVENTION

It is accordingly an object of the present invention to provide a drive control unit for driving an electric motor, which employs a duplex system but is capable of achieving accurate drive control of the electric motor without involving downtime of the entire unit even when either drive circuit is in failure.

According to a first aspect of the present invention, there is provided a drive unit for driving an electric motor, comprising: a power supply for supplying power to the electric motor; two bridge circuits provided in parallel between the power supply and the electric motor each for controllably driving the motor, each of the bridge circuits being composed of two pairs of switching devices each incorporating a reverse blocking diode; and two on-off switches each provided between the electric motor and one of the bridge circuits. One of the on-off switches is kept closed to electrically connect the electric motor and a corresponding one of the bridge circuits for enabling the electric motor to be driven via said one bridge circuit while the other on-off switch is kept open to electrically disconnect the electric motor and the other bridge circuit for inhibiting the electric motor from being driven via the other bridge circuit.

The drive unit may further include at least one fault detecting section for detecting a failure of the bridge circuits, and two switch drive circuits each provided between the fault detecting section and one of the on-off switches for activating and deactivating the corresponding on-off switch based on a signal output from the fault detecting section. The fault detecting section, when it detects a failure of one or the other of the two bridge circuits, causes the on-off switch provided between the electric motor and the failed bridge circuit to be opened via a corresponding one of the switch drive circuits.

With this arrangement, each of the two bridge circuits is capable of performing the control function over the electric motor while the other bridge circuit assumes a standby status. Thus, the electric motor is continuously driven even in case of failure of one or the other of the two bridge circuits. By virtue of the on-off switches, the current from the power supply can never flow in the failed bridge circuit, and the failed bridge circuit does not permit the electric motor to act as a generator even when any of the switching devices thereof causes an ON fault.

According to a second aspect of the present invention, there is provided a drive unit for driving an electric motor, comprising: a power supply for supplying power to the electric motor; two bridge circuits provided in parallel between the power supply and the electric motor each for controllably driving the motor, each of the bridge circuits being composed of two pairs of switching devices each incorporating a reverse blocking diode; and two on-off switches each provided between the power supply and one of the bridge circuits. One of the on-off switches is kept closed to electrically connect the power supply and a corresponding one of the bridge circuits for enabling the electric motor to be driven via said one bridge circuit while the other on-off switch is kept open to electrically disconnect the power supply and the other bridge circuit for inhibiting the electric motor from being driven via the other bridge circuit.

The drive unit may further include at least one fault detecting section for detecting a failure of the bridge circuits, and two switch drive circuits each provided between the fault detecting section and one of the on-off switches for activating and deactivating the corresponding on-off switch based on a signal output from the fault detecting section. The fault detecting section, when it detects a failure of one or the other of the two bridge circuits, causes the on-off switch provided between the electric motor and the failed bridge circuit to be opened via a corresponding one of the switch drive circuits.

The above and other objects, features and advantages of the present invention will become apparent to those versed in the art upon making reference to the following description and accompanying sheets of drawings in which certain preferred structural embodiments of the present invention are described by way of illustrative examples.

DETAILED DESCRIPTION OF THE PREFERRED EMBODIMENTS

Certain preferred embodiments of the present invention will be described in greater detail with reference to the accompanying drawings.

Figure 1:
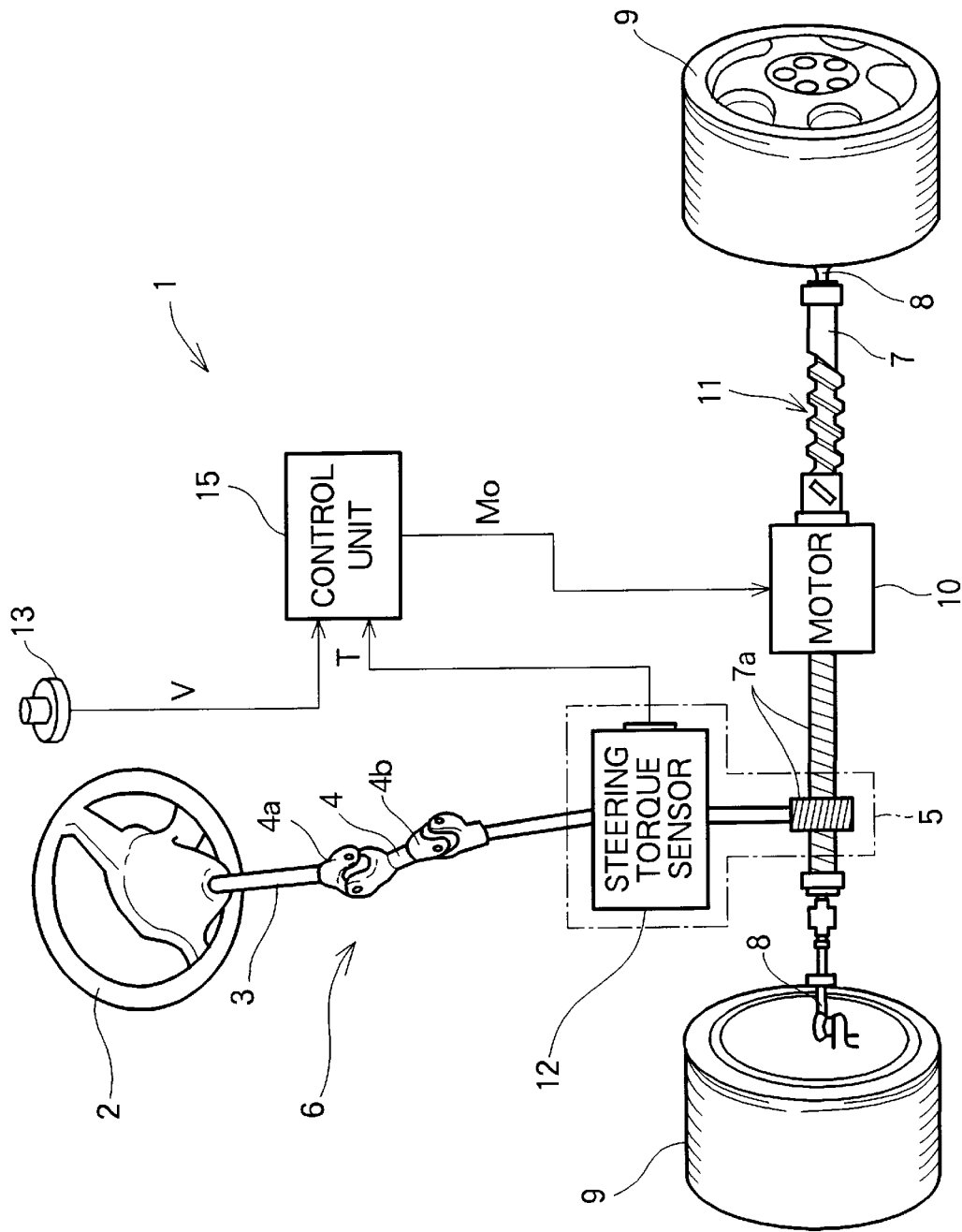
FIG. 1 is a diagrammatical view showing the general construction of a electric power steering apparatus in which a motor drive unit according to the invention is incorporated.

Referring now to FIG. 1, there is shown the general construction of an electric power steering apparatus for a motor vehicle in which a motor drive unit according to the present invention is incorporated.

The electric power steering apparatus 1 includes a steering wheel 2 connected to the upper end of a steering column or shaft 3, the lower end of the steering shaft 3 being connected by a connecting shaft 4 having universal couplings 4a, 4b at opposite ends thereof to the pinion of a rack-and-pinion mechanism 7a so as to form a manual steering power generating mechanism 6. The rack-and-pinion mechanism 5 is contained in a steering gearbox 5 and has a rack of gear teeth (not designated) formed on one end portion of a rack shaft 7.

With this arrangement, rotation of the steering shaft 3 is converted into linear reciprocation of the rack shaft 7 by the rack-and-pinion mechanism 7a. Opposite ends of the rack shaft 7 are connected by tie rods 8, 8 to steerable left and right front wheels 9, 9.

The electric power steering apparatus 1 further includes an electric motor 10 mounted concentrically with the rack shaft 7, and ball-screw mechanism 11 operatively connected with the electric motor 10. To lessen the force that must be applied by the driver to turn the steering wheel 2, the electric motor 10 generates and supplies a steering assist force or torque to a steering system operatively connecting the steering wheel 2 and the front wheels 9, 9. The steering assist torque (rotational force) generated by the electric motor 10 is converted by the ball-screw mechanism 11 into an axial thrust force which acts directly on the rack shaft 7.

A steering torque sensor for detecting a manual steering torque is disposed in the steering gearbox 5 and outputs a torque signal T corresponding to the direction and magnitude of the steering torque. The torque signal T is supplied to an electronic control unit 15.

A vehicle velocity sensor 13 detects a velocity of the vehicle and outputs a vehicle velocity signal V. The vehicle velocity signal V is supplied to the electronic control unit 15.

The electronic control unit 15 includes at least one motor control section and a pair of motor drive sections, as described later, and drives the motor 10 via a motor drive circuit (such as a bridge circuit composed of a plurality of field-effect transistors "FETs") of either of the two motor drive sections by using a motor drive signal (such as a pulse-width modulation "PWM" signal) generated on the basis of the torque signal T output from the steering torque sensor 12 and the vehicle velocity signal V output from the vehicle velocity sensor 13.

When the bridge circuit of one motor drive section is used or in operation, the bridge circuit of the other motor drive section is kept free from current flow. When either of the two bridge circuits is faulty, the electronic control unit 15 switches to the other bridge circuit.

Figure 2:
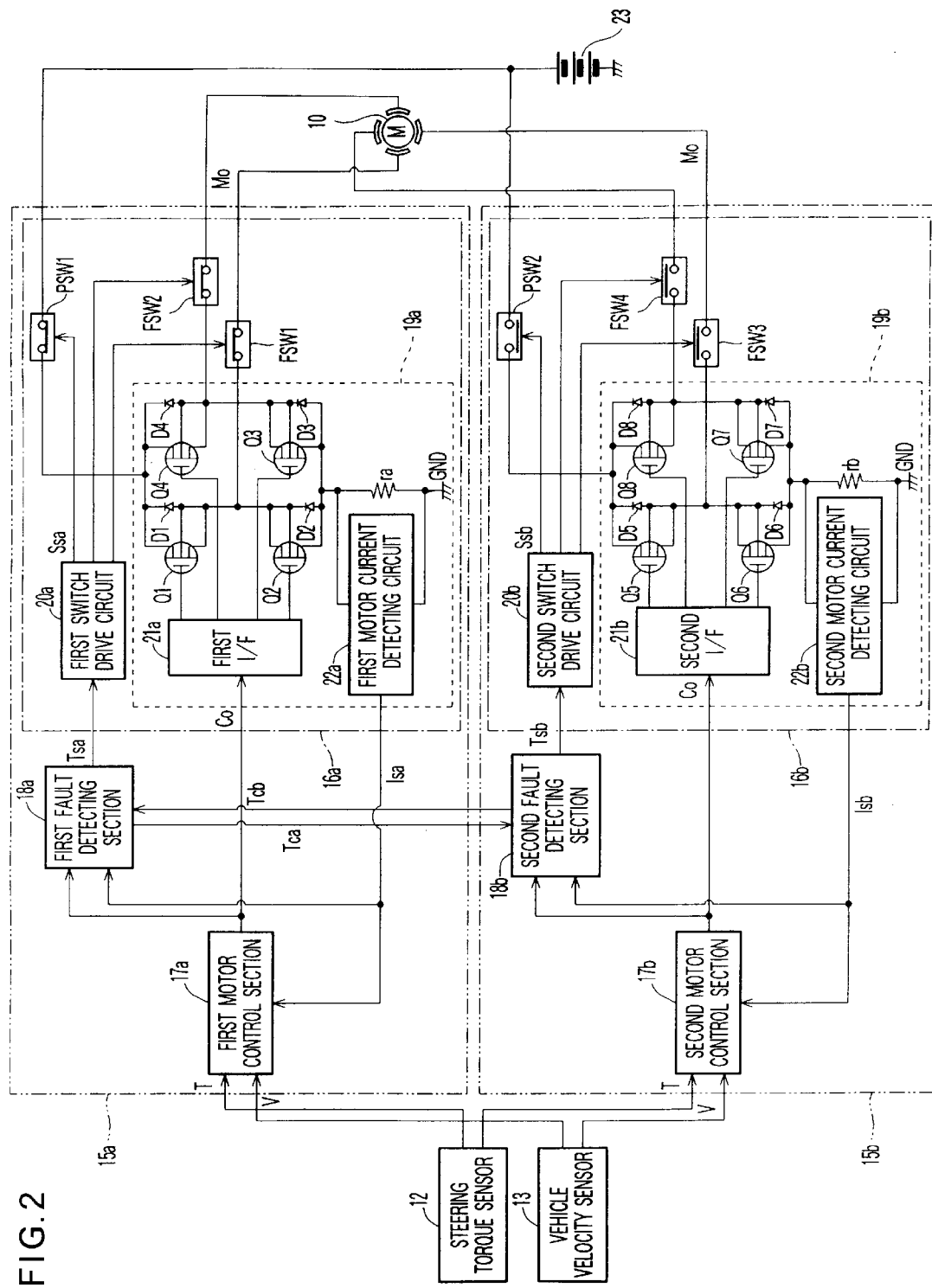
FIG. 2 is a block diagram showing a detailed arrangement of a first embodiment of an electronic control unit shown in FIG. 1.

FIG. 2 shows in block diagram a first embodiment of the electronic control unit of the electric power steering apparatus according to the present invention.

In brief, the electronic control unit is a duplex control unit composed of two electronic control units, one of which is active while the other remains on standby, ready to take over controlling if the active control unit fails.

As shown in FIG. 2, the electric power steering apparatus includes a single steering torque sensor 12, a single vehicle velocity sensor 13, two electronic control units 15a, 15b, and a single electric motor 10. The sensors 12, 13 are the same in structure and function as those shown in FIG. 1.

The first electronic control unit 15a is a microprocessor-based control unit and includes a first motor drive section or circuit 16a, a first motor control section 17a, and a first fault detecting section 18a.

The first motor control section 17a generates and outputs a motor control signal Co based on a torque signal T output from the steering torque sensor 12 and a vehicle velocity signal V output from the vehicle velocity sensor 13. The motor control signal Co is supplied to the first motor drive circuit 16a. The first motor drive circuit 16a outputs, on the basis of the motor control signal Co, a motor drive signal Mo to drive the electric motor 10.

Similarly, the second electronic control unit 15b is a microprocessor-based control unit and includes a second motor drive section or circuit 16b, a second motor control section 17b, and a second fault detecting section 18b.

The second motor control section 17b generates and outputs a motor control signal Co based on the torque signal T output from the steering torque sensor 12 and the vehicle velocity signal V output from the vehicle velocity sensor 13. The motor control signal Co is supplied to the second motor drive circuit 16b. The second motor drive circuit 16b outputs, on the basis of the motor control signal Co, a motor drive signal Mo to drive the electric motor 10.

The first and second electronic control units 15a and 15b are identical in structure and function so that the motor drive signal Mo supplied from the first electronic control unit 15a to the electric motor 10 and the motor drive signal Mo supplied from the second electronic control unit 15b to the electric motor 10 have the same value on condition that they are based on the same information from the sensors 12, 13.

The first motor drive circuit 16a includes a first switch drive circuit 20a, an on-off switch (power switch) PSW1, an on-off switch (function switch) FSW1, an on-off switch (function switch) FSW2, and a first bridge circuit 19a which are structurally and functionally the same as a second switch drive circuit 20b, an on-off switch (power switch) PSW2, an on-off switch (function switch) FSW3, an on-off switch (function switch) FSW4, and a second bridge circuit 19b of the second motor drive circuit 16b, respectively.

The first motor drive circuit 16a further includes a first interface circuit 21a, a first motor current detecting circuit 21a, four FETs Q1, Q2, Q3, Q4, four reverse blocking diodes D1, D2, D3, D4 and a motor current detecting resistance ra that are the same in construction and function as a second interface circuit 21b, a second motor current detecting circuit 21b, four FETs Q5, Q6, Q7, Q8, four reverse blocking diodes D5, D6, D7, D8 and a motor current detecting resistance rb of the second motor drive circuit 16b, respectively.

The first motor control section 17a includes a memory such as a ROM which stores data determined either theoretically or experimentally in advance about the motor control quantity corresponding to the torque signal T and the vehicle velocity signal V. When it is supplied with a torque signal T and a vehicle velocity signal V, the first motor control section 17a outputs a motor control signal Co corresponding to the torque signal T and the vehicle velocity signal V and supplies the motor control signal Co to the first motor drive circuit 16a.

In outputting the motor control signal Co from the first motor control section 17a, a current flowing in the electric motor 10 is detected via the motor current detecting resistance ra by means of the first motor current detecting circuit 22a and fed back to the first motor control section 17a in the form of a current signal Isa. The motor control signal Co supplied to the first motor drive circuit 16a is supplied to the electric motor 10 through the first bridge circuit 19a.

As described above, the first motor drive circuit 16a is composed of the first bridge circuit 19a, the switch drive circuit 20a, the on-off switches FSW1, FSW2 and the on-off switch PSW1.

The first bridge circuit 19a is composed of the first interface circuit 21a, a bridge circuit consisting of the four FETs Q1-Q4 (each incorporating one of the reverse blocking diodes), the motor current detecting circuit 22a, and the motor current detecting resistance ra.

The first motor drive circuit 16a connects the positive terminal of a motor drive power supply 23 (d.c. 12 V) to the first bridge circuit 19a by means of the on-off switch PSW1 to controllably drive the first bridge circuit 19a based on the motor control signal Co input to the first interface circuit 21a and supplies the motor drive signal Mo from the first bridge circuit 19a to the electric motor 10 through the on-off switches FSW1, FSW2 to thereby drive the electric motor 10.

The motor control signal Co input into the first interface circuit 21a is a combination of a direction signal for controlling the direction of rotation of the electric motor 10 and a PWM signal for controlling the output power (driving torque and revolutions per minute) of the electric motor 10.

For example, when the electric motor 10 is to be rotated in the counterclockwise direction, the FET Q4 is switched on by the direction signal and the gate of the FET Q2 is controlled by duty cycle of the PWM signal. Conversely when the electric motor 10 is to be rotated in the clockwise direction, the FET Q1 is switched on by the direction signal, and the gate of the FET Q3 is controlled by duty cycle of the PWM signal. The two FETs Q1 and Q4 or the two FETs Q2 and Q3 may be simultaneously switched on to make a short-circuit between input terminals of the electric motor 10 to thereby apply an electromagnetic brake to the electric motor 10.

The first bridge circuit 19a is arranged such that when the bridge circuit fails due to a short in wiring or a ground fault or when any of the switching devices (FETs Q1–Q4) in the bridge circuit malfunctions, a voltage developed across the resistance ra is detected by the first motor current detecting circuit 22a which converts the detected voltage into a current signal and outputs the current signal as a current detection signal Isa. The current detection signal Isa is supplied to the first fault detecting section 18a.

The first switch drive circuit 20a outputs, on the basis of a fault detection signal Tsa from the first fault detecting section 18a, a switch drive signal Ssa to drive or activate the on-off switches FSW1, FSW1 provided between the first bridge circuit 19a and the electric motor 10 and the on-off switch PSW1 provided between the power supply 23 and the first bridge circuit 19a. The switch drive signal Ssa is supplied to the on-off switches FSW1, FSW2 and the on-off switch PSW1.

The on-off switches FSW1, FSW2 and the on-off switch PSW1 are electronic on-off switches or electromagnetic on-off switches. These switches FSW1, FSW2 and PSW1 are normally open switches and closed or switched on when the switch drive signal Ssa is a high-level signal, for example.

The first fault detecting section 18a is composed of an oscillating circuit or oscillator and a comparing circuit or comparator (neither shown) and compares the current detection signal Isa from the first motor current detecting circuit 22a and the motor control signal Co from the motor control section 17a to detect a fault in the first motor drive circuit 16a and, upon detection of the fault, it supplies a fault detection signal Tsa to the first switch drive circuit 20a to open or switched off the on-off switches FSW1, FSW2 and the on-off switch PSW1, thereby electrically disconnecting the electric motor 10 and the first bridge circuit 19a and also the power supply 23 and the first bridge circuit 19a.

The first fault detecting section 18a also supplies a fault signal Tca to the second fault detecting section 18b of the second electronic control unit 15b provided as a backup unit. Upon receipt of the fault signal Tca, the second electronic control unit 15b activates the second motor drive circuit 16b to close or switch-on the on-off switch PSW2 and the on-off switches PSW3, PSW4 so that power from the power supply 23 is supplied to the second bridge circuit 19b and the second bridge circuit 19b is controllably driven by the motor control signal Co to output a motor drive signal Mo to the electric motor 10.

The first fault detecting section 18a also detects failures in the steering torque sensor 12, vehicle velocity sensor 13 and various circuits including a central processing unit "CPU" and, upon detection of a failure, it supplies a similar fault signal Tca to the second fault detecting section 18b of the second electronic control unit 15b to enable that the first electronic control unit 15a is replaced by the second electronic control unit 15b to continue operation of the electric motor 10.

The first fault detecting section 18a can further detect a malfunction of any of the on-off switches PSW1, FSW1 and FSW2 by inputting a test signal to the first motor drive circuit 16a when an initial diagnostic function test is performed. When a malfunctioned on-off switch PSW1, FSW1 or FSW2 is detected, the first fault detecting section 18a supplies a fault signal Tca to the second fault detecting section 18b.

When the first motor drive circuit 16a is normally operating, power from the power supply 23 is supplied to the first bridge circuit 19a through the closed on-off switch PSW 1 and the PWM-controlled motor drive signal Mo is supplied through the closed on-off switches FSW1 and FSW2 to the electric motor 10 to thereby drive the electric motor 10. In this instance, the on-off switches PSW2, FSW3 and FSW4 of the second motor drive circuit 16b are kept open.

In case of failure of the first motor drive circuit 16a, power from the power supply 23 is supplied through the closed on-off switch PSW2 to the second bridge circuit 19b and the PWM-controlled motor drive signal Mo is supplied through the closed on-off switches FSW3 and FS4 to the electric motor 10 to thereby drive the electric motor 10. In this instance, the on-off switches PSW1, FSW1 and FSW2 of the first motor drive circuit 16a are switched off or opened.

Thus, when the first motor drive circuit 16a (including the switching devices "FETs" Q1–Q4 and the reverse blocking diodes D1–D4 incorporated respectively therein) fails to function in the specified manner, the second motor drive circuit 16b is used to replace the first motor drive circuit 16a. At the same time, an appropriate visual or audible warning is provided from the first electronic control unit 15a (by way of turning on or flickering a warning lamp, or generating a vocal warning message) to make the failure of the first motor drive circuit 16a known to the driver.

Because the on-off switch PSW2 of the second motor drive circuit 16b is kept open while the first motor drive circuit 16a is in use, the current from the power supply 23 can never flow into the second motor drive circuit 16b. This is particularly advantageous because if the on-off switch PSW2 were kept closed during the use of the first motor drive circuit 16a, operation of the electric motor 10 under the control of the first motor drive circuit 16a would become inaccurate due to the effect of a reverse current flowing from the ground GND to the power supply 23 through the resistance rb, reverse blocking diode D7 and reverse blocking diode D8 when the electric motor 10 is forcibly rotated by a self-aligning torque produced by the front wheels 9, 9 (FIG. 1) and hence acting as a generator.

A further advantage attained by the on-off switch PSW2 being kept open during the use of the first motor driving circuit 16a is that even when one of the FETs Q5–Q8 (the FET Q5, for example) causes a ground fault, the current from the power supply 23 can never flow through the second bridge circuit 19b along a path formed between the power supply 23 and the ground GND through the on-off switch PSW2 and FET Q5.

Additionally, because the on-off switches FSW 3, FSW4 of the second motor drive circuit 16b are kept open to cut off electric connection between the second motor drive circuit 16b and the electric motor 10 while the first motor drive circuit 16a is in use, it is possible to prevent the occurrence of an electricity generating action by the electric motor even when an ON fault occurs in one of the RETs Q5–Q8 during the use of the first motor drive circuit 16a. If the on-off switches FSW 3, FSW4 were kept closed while the first motor drive circuit 16a is in use, an ON fault occurring in the FET Q5 would produce a closed circuit starting from the electric motor 10, passing successively through the on-off switch PSW4, reverse blocking diode D8, FET Q5 and on-off switch FSW3, and returning to the electric motor 10, which closed circuit allows the electric motor 10 to act as a generator.

When the second motor drive circuit 16b is used as a backup to replace the first motor drive circuit 16a, the on-off switch PSW1 and the on-off switches FSW1 and FSW2 are switched off or opened to thereby isolate the first motor drive circuit 16a from the power supply 23 and from the electric motor 10.

In case of failure of the second motor drive circuit 16b, the second electronic control unit 15b generates an appropriate visual or audible warning signal in the form of lighting or flickering warning lamp, or a vocal warning message, thereby making the failure of the second motor drive circuit 16b known to the driver.

The second motor drive circuit 16b is identical in construction and function with the first motor drive circuit 16a. When the second motor drive circuit 16b is in failure, the on-off switches PSW2 and the on-off switches FSW3 and FSW4 are switched off or kept open and a fault signal Tcb is supplied from the second fault detecting section 18b to the first fault detecting section 18a.

According to the illustrated embodiment, it is also possible for the first fault detecting section 18a to detect failure in the first motor control section 17a. Upon detection of the failure, the first fault detecting section 18a supplies a fault signal Tca to the second fault detecting section 18b to replace the first motor control section 17a by the second motor control section 17a to thereby continue operation of the electric motor 10.

In the first embodiment of the electric power steering apparatus, two bridge circuits are arranged in parallel between a power supply and an electric motor to controllably drive the electric motor via either of the two bridge circuits. To this end, an on-off switch disposed between the electric motor and each of the bridge circuits. When the electric motor is driven through one bridge circuit, the on-off switch disposed between this bridge circuit and the electric motor is switched on or closed while the on-off switch disposed between the other bridge circuit and the electric motor is switched off or opened. With this arrangement, it is possible to continue operation of the electric motor while preventing inflow of current from the power supply into the other bridge circuit. Additionally, the other bridge circuit is no longer possible to induce an electricity generating action of the electric motor even when an ON fault occurs in any of the switching devices constituting the other bridge circuit.

Figure 3:
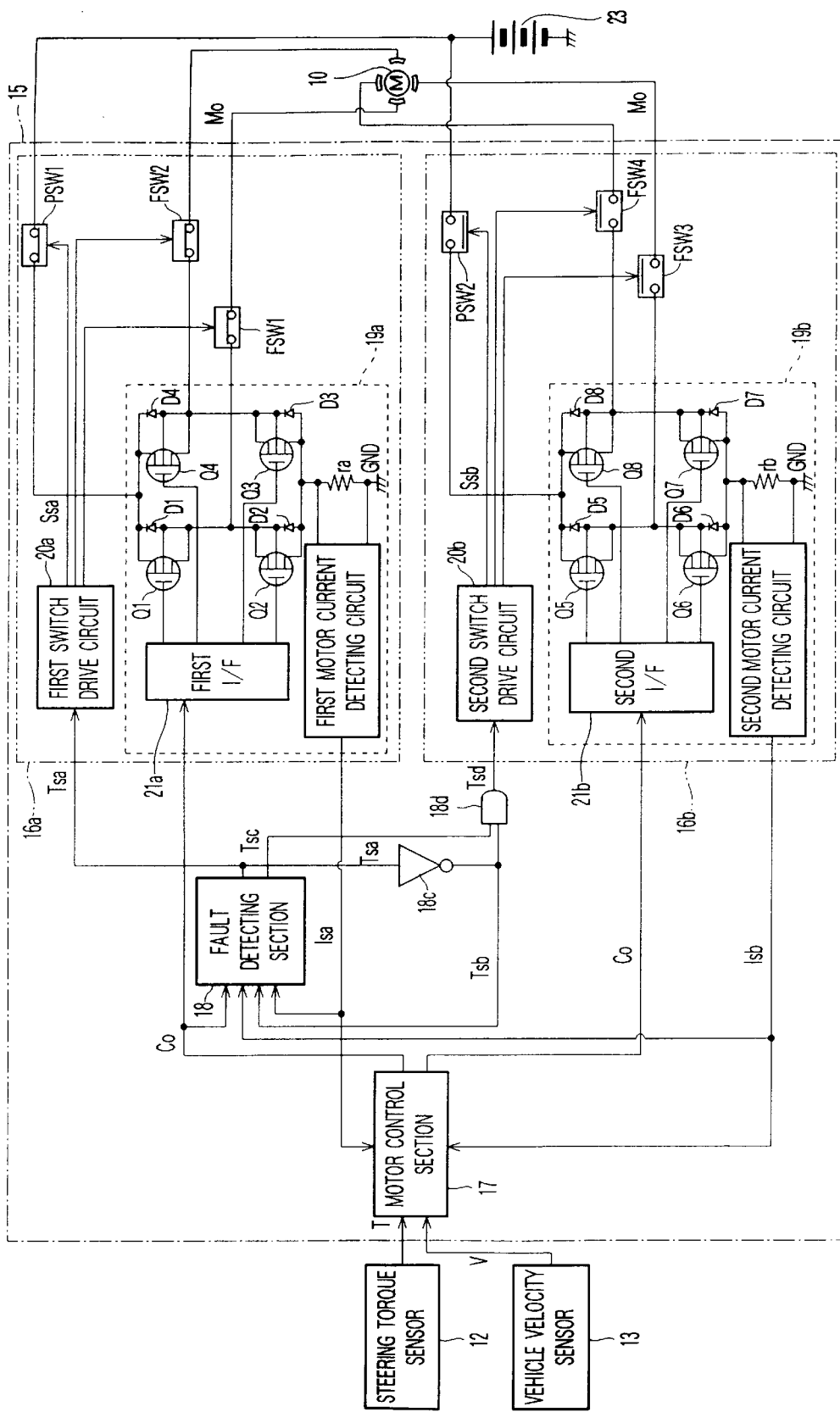
FIG. 3 is a view similar to FIG. 2, but showing a second embodiment of the electronic control unit.

Reference is made to FIG. 3 which shows in block diagram a second embodiment of the electronic control unit of the electric power steering apparatus according to the present invention.

In brief, the electronic control unit includes a single fault detecting section and two motor drive circuits each including one bridge circuit. When the fault detecting circuit detects a fault in one motor drive circuit being used for driving the electric motor, it supplies a fault signal (in the opposite state or phase from the input) to the other motor drive circuit to further continue operation of the electric motor under the control of the other motor drive circuit.

As shown in FIG. 3, the electric power steering apparatus is comprised of an electric motor 10, a steering torque sensor 12, a vehicle velocity sensor 13, and an electronic control unit 15 for controlling operation of the electric motor 10 on the basis of a steering torque detected by the steering torque sensor 12 and a vehicle velocity detected by the vehicle velocity sensor 13.

The electronic control unit 15 is a microprocessor-based electronic control unit and includes a motor control section 17, two motor drive circuits 16a and 16b, a fault detecting section 18, an inverter 18c and an AND circuit 18d.

The motor control section 17 generates a motor control signal Co by calculation based on the direction and absolute value of a torque signal T output from the steering torque sensor 12 and a vehicle velocity signal V output from the vehicle velocity sensor 13. The motor control signal Co is supplied to the first motor drive circuit 16a and the second motor drive circuit 16b. In the normal condition where both motor drive circuits 16a, 16b are free from failure, the first motor drive circuit 16a is used to generate, on the basis of the motor control signal Co, a motor drive signal Mo for driving the electric motor 10. When the first motor drive circuit 16a is in failure, the second motor drive circuit 16b takes over the first motor drive circuit 16a and a similar motor drive signal Mo for driving the electric motor 10 is supplied from the second motor drive circuit 16b. The first motor drive circuit 16a and the second motor drive circuit 16b are identical in nature and hence the motor drive signal Mo supplied from the first motor drive circuit 16a and the motor drive signal Mo supplied from the second motor drive circuit 16b provided that they are based on the same information from the sensors 12, 13.

The motor control section 17 is structurally and functionally the same as the one 17a of the first embodiment shown in FIG. 1 and a further description thereof can, therefore, be omitted.

The fault detecting section 18 is composed of an oscillator and a comparator (neither shown) and supplies a detection signal Tsa to a first switch drive circuit 20a (of the first motor drive circuit 16a) and the inverter 18c and also supplies a detection signal Tsc to the AND circuit 18d so as to perform on-off control of the first and second motor drive circuits 16a, 16b.

When the fault detecting section 18 detects a failure in the first motor drive circuit 16a or the second motor drive circuit 16b, the electronic control unit 15 makes the failure of the first or second motor drive circuit 16a, 16b known to the driver by turning on or flickering a warning lamp or providing a vocal warning message.

The detection signals Tsa and Tsc output from the fault detecting section 18 may take the following forms or phases with respect to the failure of the first or second moor drive circuits 16a.

When the first and second motor drive circuits 16a, 16b are normally operable (or free from failure or faults), the detection signals Tsa and Tsc assume a high-level signal (logical one signal).

When the first motor drive circuit 16a is in failure while the second motor drive circuit 16b is normally operable, the detection signal Tsa assumes a low-level signal (logical zero signal) while the detection signal Tsc assumes a high-level signal.

Conversely when the first motor drive circuit 16a is normal while the second motor drive circuit 16b is in failure, the detection signal Tsa assumes a high-level signal and the detection signal Tsc assumes a low-level signal.

When the first and second motor drive circuits 16a, 16b are in failure, the detection signals Tsa and Tsc assume a low-level signal.

Accordingly, when both motor drive circuits 16a, 16b are normally operable, a high-level (logical one) detection signal Tsa is supplied from the fault detecting section 18 to the first switch drive circuit 20a which in turn switches on or activate on-off switches PSW1, FSW1 and FSW2 to thereby drive the electric motor 10 via the first motor drive circuit 16a. The on-off switches PSW1, FSW1 and FSW2 are normally open switches so that upon activation by the first switch drive circuit 20a, these switches PSW1, FSW1 and FSW2 are closed. In this instance, the AND circuit 18d is supplied with a high-level (logical one) detection signal Tsc from the fault detecting section 18 and a low-level (logical zero) detection signal from the inverter 18c which inverts the high-level detection signal Tsc supplied from the fault detecting section 18. Thus, the AND circuit 18d outputs a low-level (logical zero) detection signal Tsd. The detection signal Tsd is supplied to a second switch drive circuit 20b of the second motor drive circuit 16b whereupon on-off switches PSW2, FSW3 and FSW4 of the second motor drive circuit 16b are switched off or deactivated by the second switch drive circuit 20b, thereby inhibiting the second motor drive circuit 16b from driving the electric motor 10. The on-off switches PSW2, FSW3 and FSW4 are normally open switch and, hence, upon deactivation by the second switch drive circuit 20b, these switches PSW2, FSW3 and FSW4 are opened.

In case of failure of the first motor drive circuit 16a, the fault detecting section 18 outputs a low-level detection signal Tsa and a high-level detection signal Tsc. The low-level detection signal Tsa is supplied to the first switch drive circuit 20a whereupon the on-off switches PSW1, FSW1 and FSW2 are switched off (opened) by the first switch drive circuit 20a, thereby inhibiting the first motor drive circuit 16a from driving the electric motor 10. In this instance, however, since the low-level detection signal Tsc supplied from the fault detecting section 18 to the inverter 18c is inverted into a high-level detection signal, the AND circuit 18d is supplied with the high-level detection signal Tsc from the fault detection section 18 and the high-level detection signal from the inverter 18d. Accordingly, a high-level detection signal Tsd is output from the AND circuit 18d to the second switch drive circuit 20b whereupon the on-off switches PSW2, FSW3 and FSW4 are switched on (closed) by the second switch drive circuit 20b, thereby enabling the second motor drive circuit 16b to drive the electric motor 10.

In the case where the first motor drive circuit 16a is normally operable but the second motor drive circuit 16b is in failure, the fault detecting section 18 supplies a high-level detection signal Tsa to the first switch drive circuit 20a and the inverter 18c and a low-level detection signal Tsc to one input terminal of the AND circuit 18d. The high-level detection signal Tsa activates the first switch drive circuit 20a to switch on (close) the on-off switches PSW1, FSW1 and FSW2 whereby the electric motor 10 is driven by the first motor drive circuit 16a. In this instance, the high-level detection signal Tsa supplied to the inverter 18c is inverted into a low-level detection signal and then supplied to the other input terminal of the AND circuit 18d. Thus, the AND circuit 18d outputs a low-level detection signal Tsd to the second switch drive circuit 20b to switch off (open) the on-off switches PSW2, FSW3 and FSW4, thereby inhibiting the second motor drive circuit 16b from taking part in the driving of the electric motor 10.

When the first and second motor drive circuits 16a, 16b are both failing, a low-level detection signal Tsa is supplied from the fault detecting section 18 to the first switch drive circuit 20a and a low-level detection signal Tsd is supplied from the AND circuit 18d to the second switch drive circuit 20b. Accordingly, the on-off switches PSW1, FSW1 and FSW2 of the first motor drive circuit 16a and the on-off switches PSW2, FSW3 and FSW4 of the second motor drive circuit 16b are all switched off (opened) with the result that both motor drive circuits 16a, 16b are disconnected from the electric motor 10.

Thus, whenever the first motor drive circuit 16a is normally operating, power from the power supply 23 is supplied to a first bridge circuit 19a of the first motor drive circuit 16a through the on-off switch PSW1 which is in the activated or closed condition. The electric motor 10 is driven on the basis of the PWM-controlled motor drive signal Mo supplied from the first motor drive circuit 16a via the on-off switches FSWL and FSW2 which are in the activated or closed condition.

In case of failure of the first motor drive circuit 16a, power from the power supply 23 is supplied to a second bridge circuit 19b of the second motor drive circuit 16b through the on-off switch PSW2 which is in the activated or closed condition. The electric motor 10 is driven on the basis of the PWM-controlled motor drive signal Mo supplied from the second motor drive circuit 16b via the on-off switches FSW3 and FSW4 which are in the activated or closed condition.

As described above, while the first motor drive circuit 16a is normally operating, the on-off switch PSW2 is switched off (or kept open) to electrically disconnect the second motor drive circuit 16b and the electric motor 10. Similarly, while the second motor drive circuit 16b is in use and normally operating, the on-off switch PSW1 is switched off (or kept open) to electrically disconnect the first motor drive circuit 16a and the electric motor 10. Thus, the first motor drive circuit 16a and the second motor drive circuit 16b are kept free from electrical interference with each other via the electric motor 10. This is particularly advantageous because if the on-off switch PSW2 of the second motor drive crcuit 16b were switched on or kept closed while the first motor drive circuit 16a is operating normally, driving of the electric motor 10 by the first motor drive circuit 16a would be achieved inaccurately under the effect of a reverse current flowing from the ground GND to the power supply 23 through a resistance rb, a reverse blocking diode D7 and a reverse blocking diode D8 when the electric motor 10 is forcibly rotated by a self-aligning torque produced by the front wheels 9, 9 (FIG. 1) and hence acting as a generator.

The on-off switch PSW2 being kept open during the use of the first motor driving circuit 16a is also advantageous in that even when one of the FETs Q5–Q8 (the FET Q5, for example) causes a ground fault, the current from the power supply 23 can never flow through the second bridge circuit 19b along a path formed between the power supply 23 and the ground GND through the on-off switch PSW2 and FET Q5 of the second motor drive circuit 16b.

Additionally, because the on-off switches FSW 3, FSW4 of the second motor drive circuit 16b are kept open to electrically disconnect the second motor drive circuit 16b and the electric motor 10 while the first motor drive circuit 16a is in use, it is possible to prevent the electric motor 10 from acting as a generator even when an ON fault occurs in one of the RETs Q5–Q8. If the on-off switches FSW 3, FSW4 were kept closed while the first motor drive circuit 16a is in use, an ON fault occurring in the FET Q5 would produce a closed circuit starting from the electric motor 10, passing successively through the on-off switch PSW4, reverse blocking diode D8, FET Q5 and on-off switch FSW3, and returning to the electric motor 10, which closed circuit allows the electric motor 10 to act as a generator.

According to the second embodiment shown in FIG. 3, when a failure occurs in either of the two motor drive circuits 16a, 16b, the failed motor drive circuit 16a or 16b is electrically disconnected from the electric motor 10. Accordingly, the current from the power supply 23 can never flow in the failed motor drive circuit 16a or 16b, and the failed motor drive circuit 16a or 16b does never induce an action of the electric motor 10 as a generator even when the failure is due to an ON fault of any of the switching devices in the bridge circuit 19a or 19b thereof.

Figure 4:
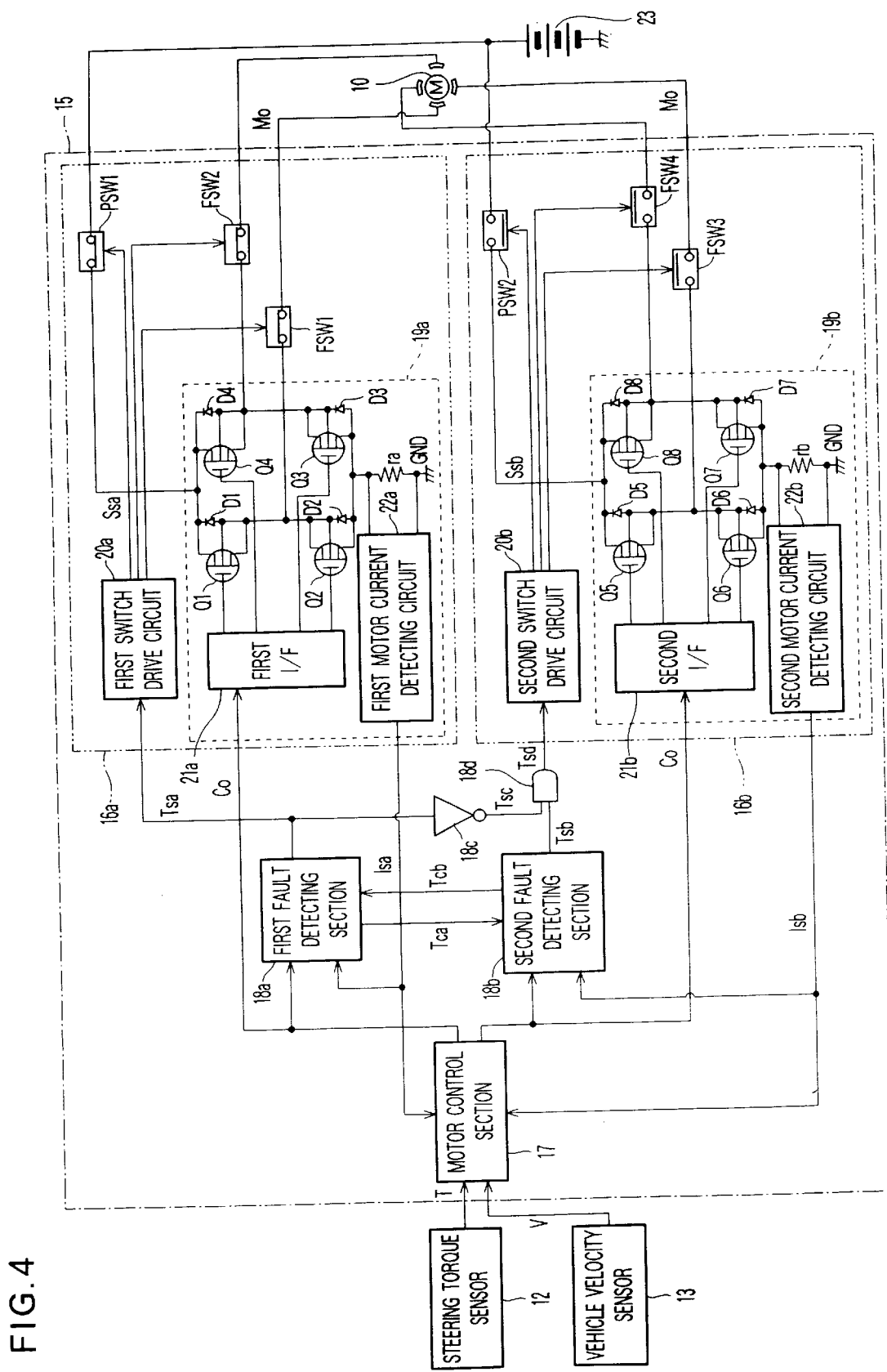
FIG. 4 is a view similar to FIG. 2, but showing a third embodiment of the electronic control unit.

FIG. 4 shows in block diagram a third embodiment of the electronic control unit used in the electric power steering apparatus according to the present invention.

In brief, the electronic control unit is comprised of a single motor control section, two fault detecting sections, and two motor drive circuits. When one of the fault detecting sections detects a failure in a corresponding one of the two motor drive circuits, it supplies a detection signal to the corresponding motor drive circuit. At the same time, the other motor drive circuit is supplied with a signal resulting from AND operation applied to a detection signal supplied from the other fault detecting section and a detection signal of opposite phase than that of the detection signal supplied from said one fault detecting section.

The electronic control unit 15 of the third embodiment shown in FIG. 4 is substantially the same as the electronic control unit 15 of the second embodiment shown in FIG. 3 with the exception that it includes two fault detecting sections 18a and 18b, and a second switch drive circuit 20b is supplied with a detection signal Tsd which results from AND operation applied to an detection signal Tsc of opposite phase than that of a detection signal Tsa supplied from the first fault detecting section 18a and a detection signal Tsb supplied from the second fault detecting section 18b.

The first and second fault detecting sections 18a, 18b are each composed of an oscillator and a comparator (neither shown). The detection signal Tsa output from the first fault detecting section 18a is supplied to a first switch drive circuit 20a and an inverter 18c. The detection signal Tsb output from the second fault detecting section 18b is supplied to one input terminal of an AND circuit 18d. The detection signal Tsc is output from the inverter 18c and supplied to the other input terminal of the AND circuit 18d. The AND circuit 18d applies AND operation to the detection signals Tsb and Tsc. The detection signal Tsd is output from the AND circuit 18d as a result of the AND operation and supplied to the second switch drive circuit 20b.

The detection signals Tsa and Tsd are used to control activation and deactivation of a first motor drive circuit 16a and a second motor drive circuit 16b, respectively.

When either of the two fault detecting sections 18a, 18b detects a failure in the corresponding motor drive circuit 16a or 16b, the electronic control units 15 makes the failure known to the driver by turning on or flickering a warning lamp or generating a vocal warning message.

The detection signal Tsa supplied from the first fault detecting section 18a and the detection signal Tsb supplied from the second fault detecting section 18b may take the forms described below with respect to a failure of the first or the second motor drive circuit 16a or 16b.

When the first motor drive circuit 16a is normally operating (i.e., free from failure or faults), the detection signal Tsa output from the first fault detecting section 18a assumes a high-level (logical one) detection signal. In case of failure of the first motor drive circuit 16a, the detection signal Tsa output from the first fault detecting section 18a assumes a low-level (logical zero) detection signal.

Similarly, when the first motor drive circuit 16a is normal (i.e., free from failure or faults), the detection signal Tsb output from the second fault detecting section 18b assumes a high-level (logical one) detection signal. In case of failure of the second motor drive circuit 16b, the detection signal Tsb output from the second fault detecting section 18b assumes a low-level (logical zero) detection signal.

When no failure exists in either circuit 16a, 16b, the first switch drive circuit 20a is supplied with a high-level detection signal Tsa. Upon receipt of the high-level detection signal Tsa, the first switch drive circuit 20a activates or closes an on-off switch PSW1 and two on-off switches FSW1 and FSW2 to thereby enable the electric motor 10 to be controllably driven via a bridge circuit 19a of the first motor drive circuit 16a. In this instance, the AND circuit 18d is supplied with the high-level detection signal Tsa from the first fault detecting section 18a and a low-level (logical zero) detection signal Tsc of opposite phase from that of the high-level detection signal Tsa supplied to the inverter 18c from the second fault detecting section 18b. Accordingly, the output from the AND circuit 18d assumes a low-level detection signal Tsd and this low-level detection signal Tsd is supplied to the second switch drive circuit 20b. Upon receipt of the low-level detection signal Tsd, the second switch drive circuit 20b deactivates or switches off an on-off switch PSW2 and two on-off switches FSW3 and FSW4, thereby inhibiting the electric motor 10 from being controllably driven via a bridge circuit 19b of the second motor drive circuit 16b.

When a failure occurs in the first motor drive circuit 16a while the second motor drive circuit 16b is normal or free from failure, a low-level detection signal Tsa is supplied from the first fault detecting section 18a to the first switch drive circuit 20a which in turn deactivates or switches off the switches PSW1, FSW1 and FSW2 to thereby terminate the drive control of the electric motor 10 by the first motor drive circuit 16a. In this instance, however, since the AND circuit 18d is supplied with a high-level detection signal Tsc from the inverter 18c (which has inverted the phase of the low-level detection signal Tsa supplied from the first fault detecting section 18a) and a high-level detection signal Tsb from the second fault detecting section 18b, a high-level (logical one) detection signal Tsd is supplied from the AND circuit 18d to the second switch drive circuit 20b. Thus, the second switch drive circuit 20b activates or switches on the on-off switches PSW2, FSW3 and FSW4 to thereby enable the drive control of the electric motor 10 by the second motor drive circuit 16b.

In the case where the first and second motor drive circuits 16a, 16b are both failing, since the detection signal Tsa and the detection signal Tsb both assume a low-level (loginal zero) detection signal, the low-level detection signal Tsa and a low-level detection signal Tsd resulting from the low-level detection signal Tsb are supplied to the first switch drive circuit 20a and the second switch drive circuit 20b, respectively. Accordingly, the on-off switches PSW1, FSW1, FSW2 and the on-off switches PSW2, FSW3, FSW4 are deactivated or switched off by the first and second switch drive circuits 20a, 20b, respectively, with the result that the electric motor 10 is electrically disconnected from the first and second motor drive circuits 16a, 16b.

As described above, when either of the two motor drive circuits 16a, 16b is in failure, the failed motor drive circuit 16a or 16b is electrically disconnected from the electric motor 10. With this arrangement, the current is prevented from flowing from the power supply into the failed motor drive circuit. The failed motor drive circuit does not allow the electric motor to act as a generator even when any of the switching devices in the bridge circuit thereof causes an ON fault.

Obviously, various minor changes and modifications of the present invention are possible in the light of the above teaching. It is to be understood that within the scope of the appended claims the present invention may be practiced otherwise than as specifically described.

What is claimed is:

1. A drive unit for driving an electric motor, comprising:

a power supply for supplying power to the electric motor;

two bridge circuits provided in parallel between said power supply and the electric motor each for controllably driving the motor, each of said bridge circuits being composed of two pairs of switching devices each incorporating a reverse blocking diode; and two on-off switches each provided between the electric motor and one of said bridge circuits, wherein one of said on-off switches is kept closed to electrically connect the electric motor and a corresponding one of said bridge circuits for enabling the electric motor to be driven via said one bridge circuit while the other on-off switch is kept open to electrically disconnect the electric motor and the other bridge circuit for inhibiting the electric motor from being driven via said other bridge circuit.

2. A drive unit according to claim 1, further including at least one fault detecting section for detecting a failure of said bridge circuits, and two switch drive circuits each provided between said fault detecting section and one of said on-off switches for activating and deactivating the corresponding on-off switch based on a signal output from said fault detecting section.

3. A drive unit according to claim 2, wherein said fault detecting section, when it detects a failure of one or the other of said two bridge circuits, causes the on-off switch provided between the electric motor and said failed bridge circuit to be opened via a corresponding one of said switch drive circuits.

4. A drive unit for driving an electric motor, comprising:

a power supply for supplying power to the electric motor;

two bridge circuits provided in parallel between said power supply and the electric motor each for controllably driving the motor, each of said bridge circuits being composed of two pairs of switching devices each incorporating a reverse blocking diode; and two on-off switches each provided between said power supply and one of said bridge circuits, wherein one of said on-off switches is kept closed to electrically connect said power supply and a corresponding one of said bridge circuits for enabling the electric motor to be driven via said one bridge circuit while the other on-off switch is kept open to electrically disconnect said power supply and the other bridge circuit for inhibiting the electric motor from being driven via said other bridge circuit.

5. A drive unit according to claim 4, further including at least one fault detecting section for detecting a failure of said bridge circuits, and two switch drive circuits each provided between said fault detecting section and one of said on-off switches for activating and deactivating the corresponding on-off switch based on a signal output from said fault detecting section.

6. A drive unit according to claim 5, wherein said fault detecting section, when it detects a failure of one or the other of said two bridge circuits, causes the on-off switch provided between the electric motor and said failed bridge circuit to be opened via a corresponding one of said switch drive circuits.

* * * * *